Dec. 16, 1924.  1,519,826
J. W. FUGE
APPLIANCE FOR USE WITH MILKING MACHINE INSTALLATIONS
FOR MEASURING EACH COW'S MILK
Filed Oct. 20, 1923  2 Sheets-Sheet 1
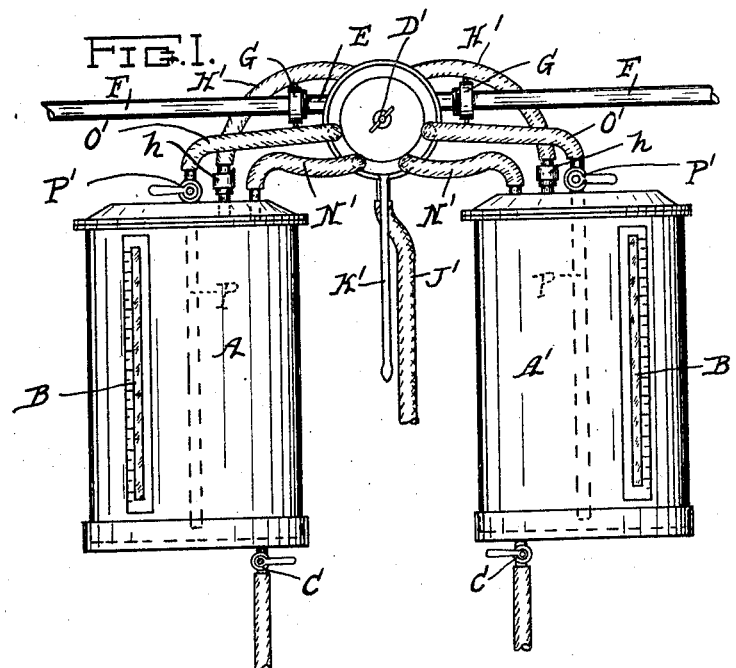
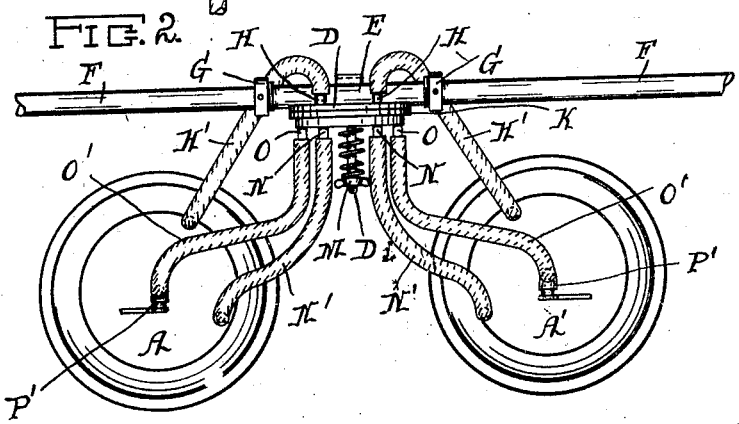
Inventor:
James Wilfred Fuge
By [signature]
Attorney.

Dec. 16, 1924. 1,519,826
J. W. FUGE
APPLIANCE FOR USE WITH MILKING MACHINE INSTALLATIONS
FOR MEASURING EACH COW'S MILK
Filed Oct. 20, 1923   2 Sheets-Sheet 2
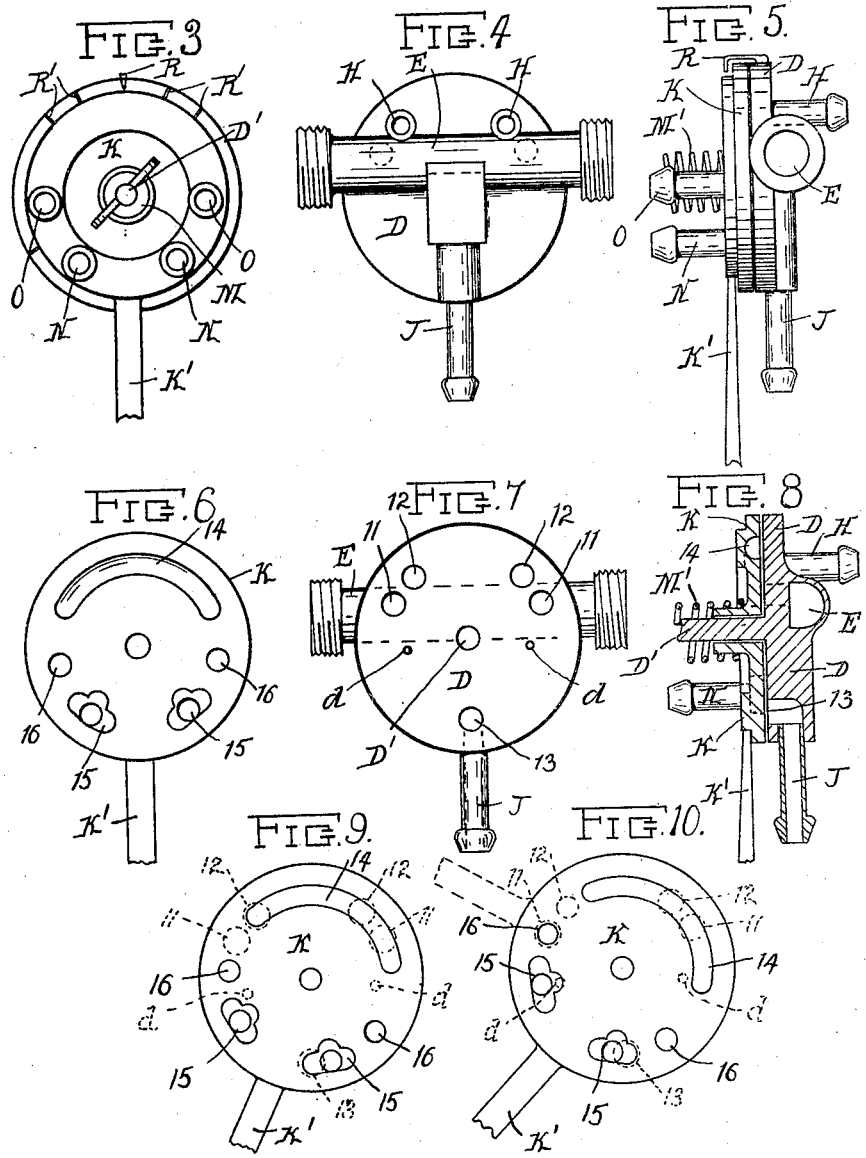
Inventor:
James Wilfred Fuge
By ⎯⎯⎯⎯
Attorney.

Patented Dec. 16, 1924.

1,519,826

UNITED STATES PATENT OFFICE.

JAMES WILFRED FUGE, OF FEATHERSTON, NEW ZEALAND, ASSIGNOR TO THE FUGE NEW WAY MILKING MACHINE AND TESTER COMPANY LIMITED, OF FEATHERSTON, NEW ZEALAND.

APPLIANCE FOR USE WITH MILKING-MACHINE INSTALLATIONS FOR MEASURING EACH COW'S MILK.

Application filed October 20, 1923. Serial No. 669,853.

*To all whom it may concern:*

Be it known that I, JAMES WILFRED FUGE, subject of the King of Great Britain, residing at Kahautara Road, Featherston, in the Dominion of New Zealand, have invented new and useful Improvements in Appliances for Use with Milking-Machine Installations for Measuring Each Cow's Milk, of which the following is a specification.

This invention has reference to that known class of appliance for use with milking machine installations for the purpose of measuring each cow's milk as it is milked, and then for passing such milk on to a releaser apparatus to be delivered into the ordinary receptacle. These appliances are in some instances formed by two cans that are used in alternation with one another in receiving the milk from the cows as they are milked. Each can is adapted to be interposed between the vacuum source and the teat cups, so that it receives the milk, and then after the milking has finished, is disconnected from the teat cups, and the milk contained within it sent away to the releaser main. Each can also is provided with a gauge glass indicator by means of which the measure of the milk received in the can may be ascertained. It is also furnished with means whereby the hand strippings may be added to the main quantity so that the whole of the milk from each cow is accurately measured.

The present invention consists in a special form of valve apparatus designed for use in connection with such a pair of cans, by means of which provision is made through the operation of a single control lever, for each can being connected with vacuum and with the teat cups, while the other is connected with the releaser main, in turn, by the movements of the lever to its different positions, so that the cans work in alternation to receive the milk, and after the hand strippings are added thereto, to deliver that milk to the releaser main.

The said invention is illustrated in the accompanying drawings and will be hereinafter fully described in relation thereto.

In the drawings:—

Figure 1 is a front elevation of a pair of measuring cans and of the valve controlling apparatus arranged in working condition.

Figure 2 is a plan thereof.

Figures 3 to 8 are detail views of the valve apparatus, on an enlarged scale,

Figure 3 being a front elevation,

Figure 4 a back elevation,

Figure 5 a side elevation,

Figure 6 a rear face view of the front member of the valve,

Figure 7 a front face view of the back member thereof, and

Figure 8 a sectional side elevation thereof.

Figure 9 is a view illustrating the connections made on a first movement of the valve.

Figure 10 is a similar view showing the second movement.

A—A' (Figures 1 and 2) represent the usual measuring cans, each of which is made of the desired capacity and of an airtight nature and each of which is fitted with the measuring gauge glass B or B' and with a valve controlled inlet C entering its bottom and used for drawing the milk constituting the hand strippings of a cow, into the can when such can is in vacuum. These general features are common to this class of appliance.

The valve apparatus, as designed for the working of these cans, is arranged in between the two cans, and as shown in the drawings, comprises a main base plate D, preferably of circular disc form, that is fixed to a tubular fitting E extending across its back above its centre line and which fitting is adapted to be interposed within the vacuum releaser main F of the installation by the union nuts G, or other jointing means provided for that purpose.

The said base plate D is formed on each side of its central vertical line and in its top portion with a port 11 which opens through from its front face into the pipe passage E behind. These ports are hereinafter referred to as the releaser ports. The base plate is also formed on each side of its central line, near its top, with a port 12 that opens through from the front and into a nipple fitting H projecting rearwards and which nipple is then connected by the tube H' (Figures 1 and 2) having a non-return valve h' therein, directly with the top of the can situated on that side of the valve. These ports 12 will be hereinafter referred to as the vacuum ports. The several ports 11 and 12 are all disposed in the same concentric line.

At the bottom of the base plate's central line, and also disposed concentrically with the other ports, is another port 13 that opens through from the front into a nipple J extending vertically downward from the bottom of the plate. This nipple receives the end of the teat cup connecting tube J' and its port 13 will be hereinafter referred to as the milk port.

The base plate, in addition, is formed on each side of its central line with a small aperture d passing right through it and the purpose of which will be hereafter described. These apertures are inside the concentric line of the other ports and will be referred to as air inlets.

Combined with the base plate D is a valve plate K that is mounted to turn upon a bearing pin D' fixed to project centrally from the base plate and having a radial handle extension K' by means of which it may be turned. The engaging faces of the plates D and K are made smooth so that an airtight engagement may be effected between them. The two are kept in close frictional engagement, in order that the plate K may retain the position to which it is turned, by means of a clamping nut M screwed on the outer end of the pin D' and bearing upon a helical compression spring M' mounted upon the pin and the inner end of which bears upon the plate K.

This plate K is made on its inside face in the upper half, with a groove 14 arranged in a concentric line coincident with the ports 11, 12 and 13 of the plate D. The groove is also made of such a length that when the plate is in a central position, as when the handle is extending vertically downward, the groove will extend between both releaser ports 11, thus also covering the intermediate ports 12. It is also of such a length that when the plate is turned to either side to an almost reversed position, it will bridge the milk port 13 and the releaser port 11 on that side.

In addition, the plate K on each side of its lower half, near the bottom, is formed with a port 15 opening through from its back face to a nipple N fitted to project from the front of the plate. This nipple is then connected by the flexible pipe connection N' with the can situated on that side of the valve, through a fitting passing into the top of the can. A further port 16 is formed in each side of this plate at a point between the port 15 and the end of the groove 14 and this port opens into a nipple O projecting from the front of the plate which nipple in turn is connected by a flexible pipe connection O' with the upper end of a pipe P that is fitted to extend down into the can on that side, to a point near its bottom.

This pipe has a control valve P' on its upper end to allow of it being shut off when it is not required to work the can on that side.

The several ports 15 and 16 are all disposed in the same concentric line with the groove 14 and coincident with the beforementioned ports in the plate D.

In the operation of the valve, the neutral position is that shown in Figures 1 to 8 and in this position both cans are connected with vacuum through the bridging of the releaser ports 11 and vacuum ports 12 by the groove 14, and a solid part of the plate K is over the milk port 13 to seal it. A movement of the plate K to the right for a specific distance to a first position, will cause the groove 14 to move away from the releaser port 11 on that side, while maintaining the connection of both cans with vacuum through the ports 12 and the remaining port 11, and at the same time will move the port 15 on the left side of the valve plate across over the milk port 13. The can on the left hand side will thus be connected to the teat cups through the valve and being also connected to vacuum, milking of the cow into that can may proceed. When the milking has finished, the valve is moved back to neutral to retain the milk in the can and to permit of the teat cups being placed on the next cow to be milked.

When this has been done, the valve is moved over to the first position to the left, which is the position shown in Figure 9, and thereby connects the right hand can with the teat cups so as to receive the milk from the second cow. At the same time while this milking is proceeding the left hand can is retained in vacuum connection so that the milk representing the hand strippings of the first milked cow may be introduced into it through the valve C thereof. The full amount is then read from the gauge glass and the valve is moved further to the left to a second position shown in Figure 10. This will have the result of bringing the port 16 on that side into coincidence with the releaser port 11, while still maintaining vacuum connection between the right hand can and the releaser main, and also maintaining connection between the same can and the teat cups, the ports 15, each being made of sufficient length to establish connection between it and the milk port 13, as the valve is moved from first to second position. In this position of the valve, connection is established between the left hand can and the releaser main F through the connection O' and pipe P leading into the bottom of the can so that the milk is drawn away from the said can to the main, the necessary air admission to ensure of its flow being obtained by the coinciding of a portion of the port 15 with the air inlet d on that side, to permit air to pass through the connection N′ to break down the vacuum in that can, which occurs when the valve is moved to the second position. In Figures 9 and 10 the ports in the fixed plate D are shown by the dotted lines, while those in the moving part, as also the groove therein, are shown by the full lines.

During these operations the milking of the cow into the other can has been proceeding and is allowed to continue until the cow is finished, when the valve is moved back to neutral and the aforesaid operations repeated in a reverse manner by the moving of the valve to first and second positions upon the other side.

If it is desired to convey the milk directly from the cow to the releaser main, thereby cutting out the measuring cans, the valve is moved right around to either side until the groove 14 bridges the milk port 13 and releaser port 11 on that side. The milk will then flow along the groove to the main. The position of the valve in these conditions is indicated by the dotted lines in Figure 10.

The valve is provided with suitable indications, as the pointer R on the stationary part and the markings R′ on the moving part (shown in Figure 3), whereby its correct adjustment to obtain the proper connections, is obtained.

The whole operations incidental to the milking of cows in sequence and alternately into the two cans are thus controlled by the movements of the valve to the different positions indicated, on each side of its central neutral position, the machine milking of one cow into one can proceeding while the hand strippings are taken from the previously milked cow, added to the contents of the other can and the whole measured and then sent away to the releaser main.

I claim:—

1. In a vacuum-operated liquid dispensing installation, the combination, with an inlet pipe for the liquid, a pair of air-tight vessels, and a vacuum main: of a valve disposed between such vessels and comprising a fixed part having two ports connecting with the vacuum main, two ports connecting respectively with the two vessels, and a single port connected to the inlet pipe; and a movable part mounted on the surface of the said fixed part and constructed with port connections leading one to the top of each vessel and one to the bottom of each vessel, and with a groove on its face adjacent to the fixed part adapted to bridge the vacuum main ports and vessel-connected ports of the fixed part; said ports and groove being relatively so disposed that in a central position of the movable part of the valve both vessels are connected to the vacuum main, in a first position of the movable part to either side of said central position both vessels are still connected with the vacuum main and one vessel is also connected with the inlet pipe, and in a second position of the movable part to the same side the connection of the said vessel with the vacuum main and with the inlet pipe is maintained, while the other vessel is connected only to the vacuum main through the connection leading into its bottom.

2. A vacuum-operated liquid dispensing installation, according to claim 1, in which, the fixed part of the valve consists of a disc provided with a vacuum main passage which extends across its back and into which the two vacuum main ports open, and also provided with a central pivot pin which projects forward from its front; and in which the movable part likewise consists of a disc mounted to turn on said pivot pin and kept in close engagement with the fixed disc.

3. A vacuum-operated liquid dispensing installation, according to claim 1, in which the fixed part of the valve is formed with air inlets so positioned that the movement of the movable part of the valve to its second position admits air to the top of the vessel then connected with the vacuum main through the connection leading from its bottom.

In testimony whereof, I affix my signature.

JAMES WILFRED FUGE.